US006871917B2

(12) United States Patent
Giers et al.

(10) Patent No.: US 6,871,917 B2
(45) Date of Patent: Mar. 29, 2005

(54) DEVICE FOR CONTROLLING ELECTROMAGNETICALLY OPERATED VALVES

(75) Inventors: Bernhard Giers, Frankfurt (DE); Robert Schmidt, Rennerod (DE); Stefan Stölzl, Weinheim (DE); Ralf Junge, Steinbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/416,386

(22) PCT Filed: Nov. 9, 2001

(86) PCT No.: PCT/EP01/13008

§ 371 (c)(1),
(2), (4) Date: May 9, 2003

(87) PCT Pub. No.: WO02/38427

PCT Pub. Date: May 16, 2002

(65) Prior Publication Data

US 2004/0041467 A1 Mar. 4, 2004

(30) Foreign Application Priority Data

Nov. 10, 2000 (DE) .......................................... 100 55 807
Nov. 2, 2001 (DE) .......................................... 101 53 849

(51) Int. Cl.⁷ .................................................. B60T 8/88
(52) U.S. Cl. .................................. 303/122.04; 303/199
(58) Field of Search ............................. 303/20, 122.04, 303/122.05, 199, DIG. 1; 701/70

(56) References Cited

U.S. PATENT DOCUMENTS 5,526,264 A * 6/1996 Niggemann et al. ... 303/122.05
6,189,982 B1 * 2/2001 Harris et al. ............. 303/119.1
6,206,482 B1 * 3/2001 Campau et al. ................ 303/20
6,206,489 B1 * 3/2001 Schmidt et al. ........ 303/122.08
6,234,588 B1 * 5/2001 Sawada .................... 303/119.1
6,499,811 B2 * 12/2002 Kumabe et al. .............. 303/20
6,582,030 B2 * 6/2003 Harris ........................... 303/2

FOREIGN PATENT DOCUMENTS

| DE | 69109242 | 8/1995 |
| DE | 19715024 | 10/1998 |
| DE | 19835881 | 4/1999 |
| DE | 19915253 | 10/2000 |
| EP | 0937614 | 8/1999 |
| EP | 0937623 | 8/1999 |
| GB | 2349676 | 11/2000 |

OTHER PUBLICATIONS

Search Report of the German Patent Office Appln 10153849.9.

* cited by examiner

Primary Examiner—Thomas Williams
(74) Attorney, Agent, or Firm—Honigman Miller Schwartz & Cohn LLP

(57) ABSTRACT

The present invention relates to a device for controlling electromagnetically operable valves of an electrohydraulic brake system for motor vehicles of the 'brake-by-wire' type having an electronic control or regulation unit that comprises at least one valve driver stage. In order to ensure maximum possible availability of the electronically controlled system functions, especially with a view to achieving a short stopping distance and a sufficient degree of vehicle stability regardless of the vehicle type or of whether the vehicle is loaded or unloaded, according to the present invention, the control and regulation unit includes two additional valve driver stages associated with which is a first and a second group of valves, the said driver stages being used to disable the first or the second group when malfunction occurs.

3 Claims, 3 Drawing Sheets

DEVICE FOR CONTROLLING ELECTROMAGNETICALLY OPERATED VALVES

TECHNICAL FIELD

The present invention generally relates to a device for controlling valves and more particularly relates to a device for controlling electromagnetically operable valves of an electrohydraulic brake system for motor vehicles.

BACKGROUND OF THE INVENTION

International patent application WO 00/68053 discloses a brake system of this general type. The mentioned publication, however, does not provide any the failure probability of the actuation of the electromagnetically operable valves employed.

SUMMARY OF THE INVENTION

In view of the above, an object of the present invention is to disclose a device for actuating electromagnetically operable valves of an electrohydraulic brake system of the type mentioned hereinabove, said device ensuring maximum possible availability of the electronically controlled system functions, especially with a view to achieving a short stopping distance and a sufficient degree of vehicle stability regardless of the vehicle type or of whether the vehicle is loaded or unloaded.

This object is achieved by the present invention because the control and regulation unit includes two additional valve driver stages associated with which is a first and a second group of valves, the said driver stages isolating said group in addition from the supply voltage or mass, with a view to ensuring thereby the disabling of the first or the second group also when malfunction occurs.

The present invention includes, in a first embodiment, a first valve driver stage for driving the separating valves and for driving the pressure control valves respectively associated with a brake of a first or a second vehicle axle. The present invention also includes a second valve driver stage for driving pressure-compensating valves and pressure control valves associated with the other two wheel brakes of the first or the second vehicle axle. The mentioned variant permits an electronic brake pressure control on each of the four vehicle wheels.

A second embodiment of the present invention is that the first valve driver stage is coupled to the separating valve of a first vehicle axle, the pressure-compensating valve of a second vehicle axle, and the pressure control valves being associated with respectively one brake of the first or the second vehicle axle, while the second valve driver stage is provided for the separating valve of the second vehicle axle, the pressure-compensating valve of the first vehicle axle, and the pressure control valves being associated with the other two brakes of the first or the second vehicle axle. This variant allows an electronic brake pressure control of three wheels, while the master brake cylinder furnishes the brake pressure for the wheel brake associated with the fourth wheel.

Finally, a third embodiment of the present invention includes coupling the first valve driver stage to the separating valve and the pressure-compensating valve as well as the pressure control valves of wheel brakes associated with a first vehicle axle, while the second valve driver stage is provided for the separating valve and the pressure-compensating valve as well as the pressure control valves of wheel brakes associated with a second vehicle axle. This allocation allows an electronic brake pressure control of two wheels, while the pressure introduced by the driver into the master brake cylinder is applied to the wheel brakes of the other wheels.

DETAILED DESCRIPTION OF THE PREFERRED EMBODIMENTS

Figure 1:
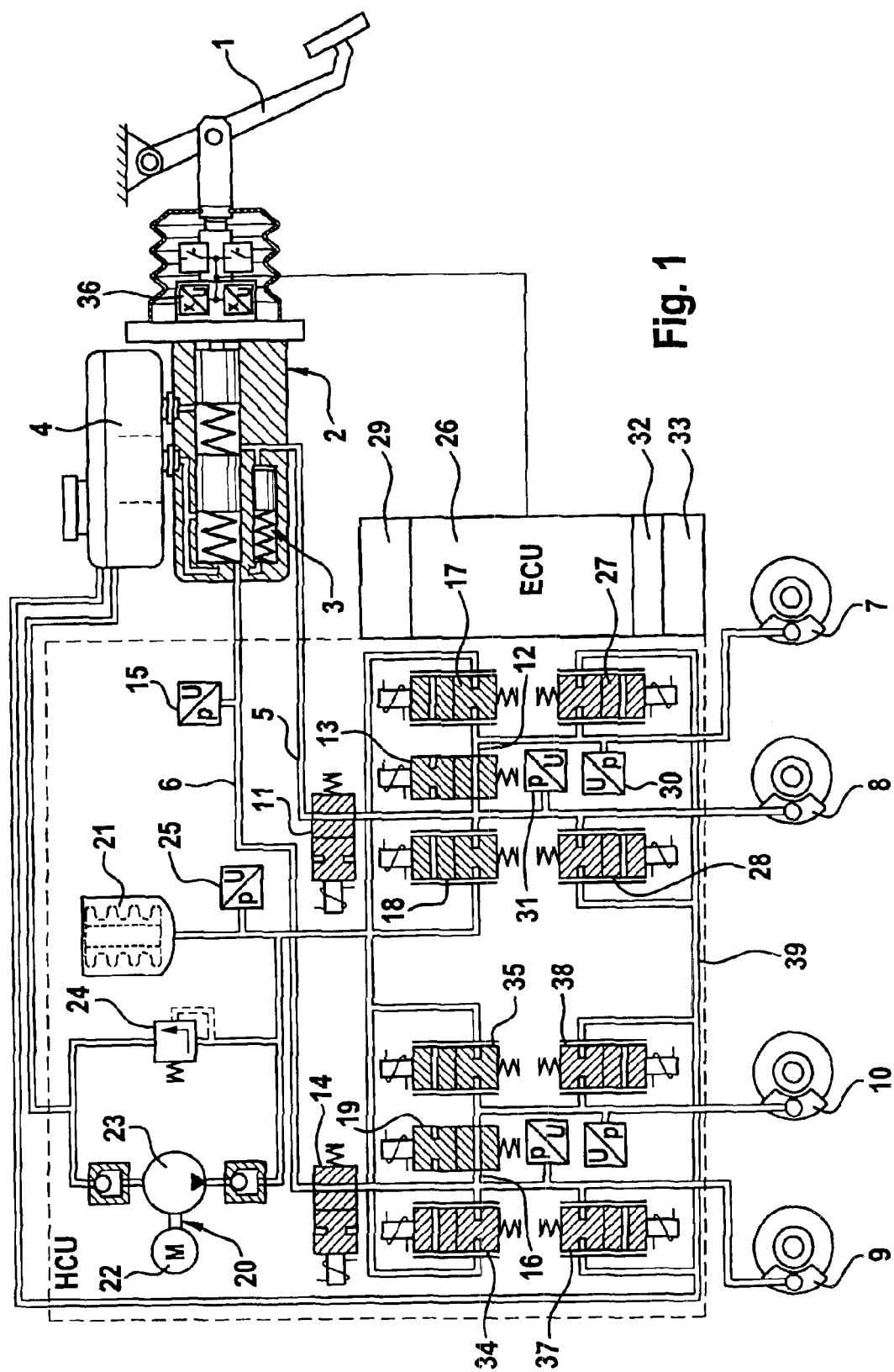
FIG. 1 is a simplified circuit diagram of a design of the electrohydraulic brake system of the present invention.

The electrohydraulic brake system illustrated in the drawings essentially comprises a dual-circuit master brake cylinder or tandem master cylinder 2 that is operable by means of an actuating pedal 1, cooperates with a pedal travel simulator 3 and includes two pressure chambers isolated from one another and being in communication with a non-pressurized pressure fluid supply reservoir 4. Wheel brakes 7, 8 e.g. associated with the rear axle are connected to the first pressure chamber (primary pressure chamber) by means of a closable first hydraulic line 5, with wheel brake 7 being associated with the left rear wheel and wheel brake 8 being associated with the right rear wheel. Line 5 is closed by means of a first separating valve 11, while in a line portion 12 between the wheel brakes 7, 8 an electromagnetically operable, preferably normally open (NO) pressure-compensating valve 13 is inserted which enables brake pressure control on each individual wheel, if required.

The second pressure chamber of the master brake cylinder 2, to which a pressure sensor 15 can be connected, is connectable to the other pair of wheel brakes 9, 10 associated with the front axle by way of a second hydraulic line 6 closable by means of a second separating valve 14, with wheel brake 9 being associated with the left front wheel and wheel brake 10 being associated with the right front wheel. Again, an electromagnetically operable, preferably normally open (NO) pressure-compensating valve 19 is inserted into a line portion 16 disposed between the wheel brakes 9, 10. Because the design of the hydraulic circuit connected to the second pressure chamber of the master brake cylinder 2 is identical with the brake circuit 11 that is explained in the preceding description, it need not be discussed in the following text.

A high-pressure accumulator 21 is used as the above-mentioned auxiliary pressure source, said accumulator being filled with pressure fluid under high pressure by a motor-and-pump assembly 20. The motor-and-pump assembly 20 comprises a pump 23 driven by means of an electric motor 22 as well as a pressure limiting valve 24 connected in parallel to said pump 23. The suction side of the pump 23 is connected to the above-mentioned pressure fluid supply reservoir 4 by way of a non-return valve. A pressure sensor 25 monitors the hydraulic filling pressure of the high-pressure accumulator 21 generated by the pump 23.

As can further be taken from the drawings, two electromagnetic, normally closed two-way/two-position directional control valves 17, 18 of analog operation are associated with the wheel brakes 7, 8 of the vehicle rear axle, said valves fulfilling the function of inlet valves that are required for electrohydraulically controlled braking operations and the inlet ports of which are connected to the above-mentioned high-pressure accumulator 21. Further, the wheel brakes 7, 8 are connected to a third hydraulic line 39 by way of each one electromagnetic, normally closed two-way/two-position directional control valve or outlet valve 27, 28 of analog operation, said line 39 being in communication with the non-pressurized pressure fluid supply reservoir 4, on the other hand. The hydraulic pressure prevailing in the wheel brakes 7, 8 is determined by means of each one pressure sensor 30, 31. The wheel brakes 9, 10 associated with the vehicle front axle cooperate similarly with valve pairs 34, 37 and 35, 38, respectively, with pressure control valves 34, 35 fulfilling the function of the inlet valves and pressure control valves 37, 38 fulfilling the function of the outlet valves.

An electronic control unit 26 is used for the joint actuation of the motor-and-pump assembly 20 as well as the electromagnetic valves 11, 13, 14, 17, 18, 19, 27, 28, 34, 35, 37, 38. The output signals of an actuating travel sensor 36, preferably of redundant design and cooperating with the actuating pedal 1, and of the above-mentioned pressure sensor 15 are sent as input signals to said control unit 26, thereby permitting a detection of the driver's deceleration demand. However, other means such as a force sensor sensing the actuating force at the actuating pedal 1 may also be used for the detection of the driver's deceleration demand. As further input quantities, the output signals of the pressure sensors 25, 30, 31 as well as the output signals of wheel sensors (only represented) representative of the speed of the vehicle are sent to the electronic control unit 26.

As is indicated in FIG. 1 only schematically, the electronic control unit 26 among others comprises a valve driver stage 29 and two additional valve driver stages 32, 33, the purpose of which is explained in the following text.

To ensure maximum possible availability of the electronically controlled system functions of the illustrated electrohydraulic brake system, the above-mentioned electromagnetically operable valves are subdivided into two groups and associated with the two additional valve driver stages 32, 33. Thus, the group associated with the first additional valve driver stage 32 is composed of the two separating valves 11, 14, the pressure control valves 34, 37 of the wheel brake 9 associated with the left front wheel, and the pressure control valves 18, 28 of the wheel brake 8 associated with the right rear wheel. In contrast thereto, the group associated with the second additional valve driver stage 33 is composed of the two pressure-compensating valves 13, 19, the pressure control valves 35, 38 of the wheel brake 10 associated with the right front wheel as well as the pressure control valves 17, 27 of the wheel brake 7 associated with the left rear wheels.

Upon failure of the first additional valve driver stage 32 or one of the drivers of the associated valve group, said failure requiring subsequent closure of the pressure-compensating valves 13, 19, it is still possible to electronically control the brake pressures in the wheel brake 10 associated with the right front wheel and the wheel brake 7 associated with the left rear wheel. A hydraulic through grip effected by the driver by way of his/her actuating or pedal force acting upon the master brake cylinder 2 can produce the brake pressures in the wheel brake 9 associated with the left front wheel and in the wheel brake 8 associated with the right rear wheel.

Upon failure of the second additional valve driver stage 33 or one of the drivers of the associated valve group, the two separating valves 11, 14 can become closed. Since both pressure-compensating valves 13, 19 remain open, the brake pressures in all four wheel brakes 7–10 can be controlled electronically because the front axle is controlled by way of the valve pair 34, 37 and the rear axle by way of the valve pair 18, 28.

Figure 2:
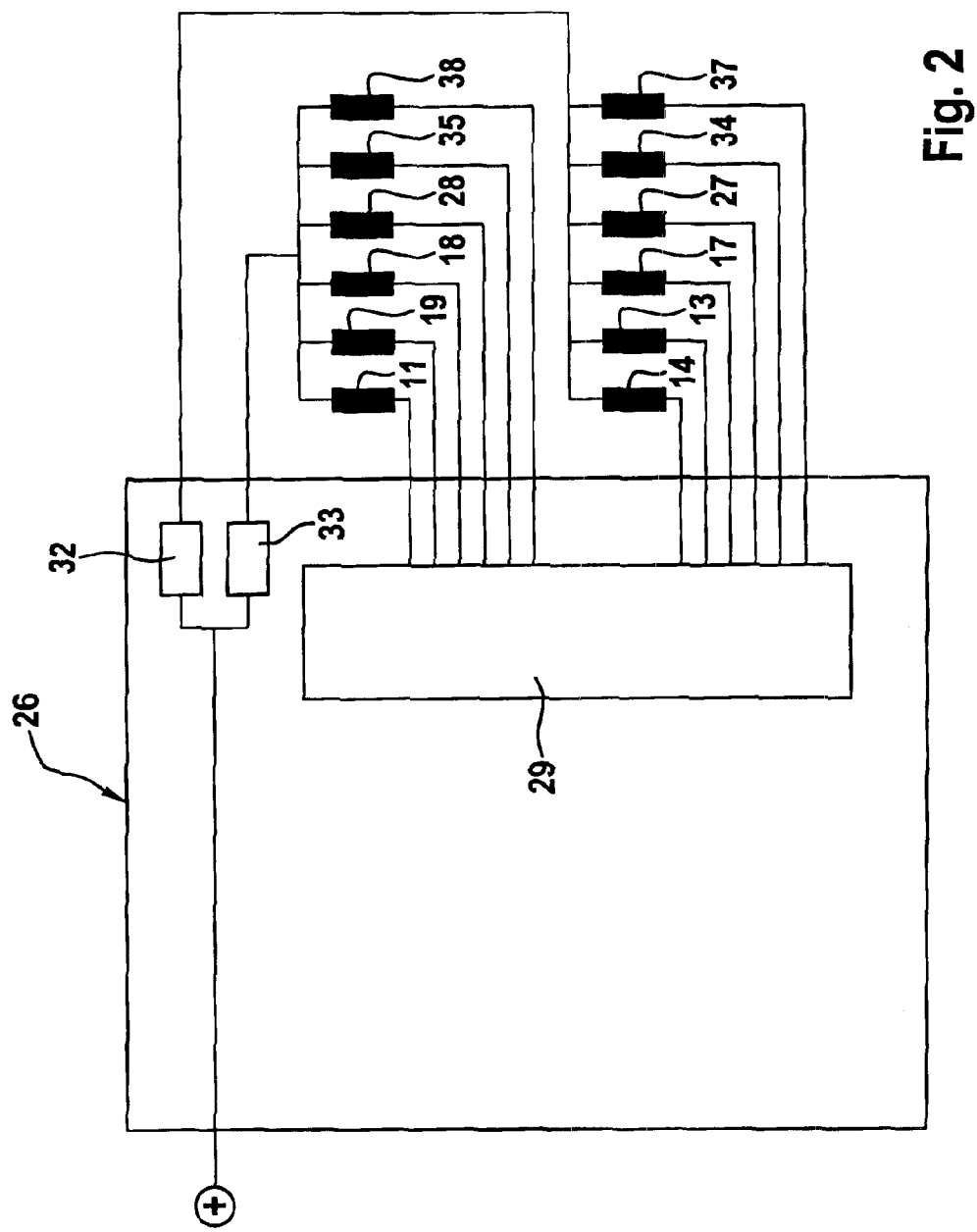
FIG. 2 is a second alternative of actuating the electromagnetic valves in an electrohydraulic brake system according to FIG. 1.

In the second example being shown in a greatly simplified view in FIG. 2, the group associated with the first additional valve driver stage 32 is composed of the separating valve 14 associated with the vehicle front axle, the pressure control valves 34, 37 of the wheel brake 9 associated with the left front wheel, the pressure-compensating valve 13 associated with the vehicle rear axle, as well as the pressure control valves 17, 27 of the wheel brake 7 associated with the left rear wheel. In contrast thereto, the group associated with the second additional valve driver stage 33 is composed of the separating valves 11 associated with the vehicle rear axle, the pressure control valves 18, 28 of the wheel brake 8 associated with the right rear wheel, the pressure-compensating valve 19 associated with the vehicle front axle as well as the pressure control valves 35, 38 of the wheel brake 10 associated with the right front wheel.

Upon failure of the first additional valve driver stage 32 or one of the drivers of the associated valve group, said failure requiring subsequent closure of the pressure-compensating valve 19 associated with the vehicle front axle and the separating valve 11 associated with the vehicle rear axle, it is still possible to electronically control the brake pressures in the wheel brake 10 associated with the right front wheel and the wheel brakes 7, 8 associated with the rear vehicle axle. A hydraulic through grip effected by the driver by way of his/her actuating or pedal force acting upon the master brake cylinder 2 can produce the brake pressure in the wheel brake 9 associated with the left front wheel.

Upon failure of the second additional valve driver stage 33 or one of the drivers of the associated valve group, said failure requiring subsequent closure of the pressure-compensating valve 13 associated with the vehicle rear axle and the separating valve 14 associated with the vehicle front axle, it is still possible to electronically control the brake pressures in the wheel brake 7 associated with the left rear wheel and the wheel brakes 9, 10 associated with the vehicle front axle. A hydraulic through grip effected by the driver by way of his/her actuating or pedal force acting upon the master brake cylinder 2 can produce the brake pressure in the wheel brake 8 associated with the right rear wheel.

Figure 3:
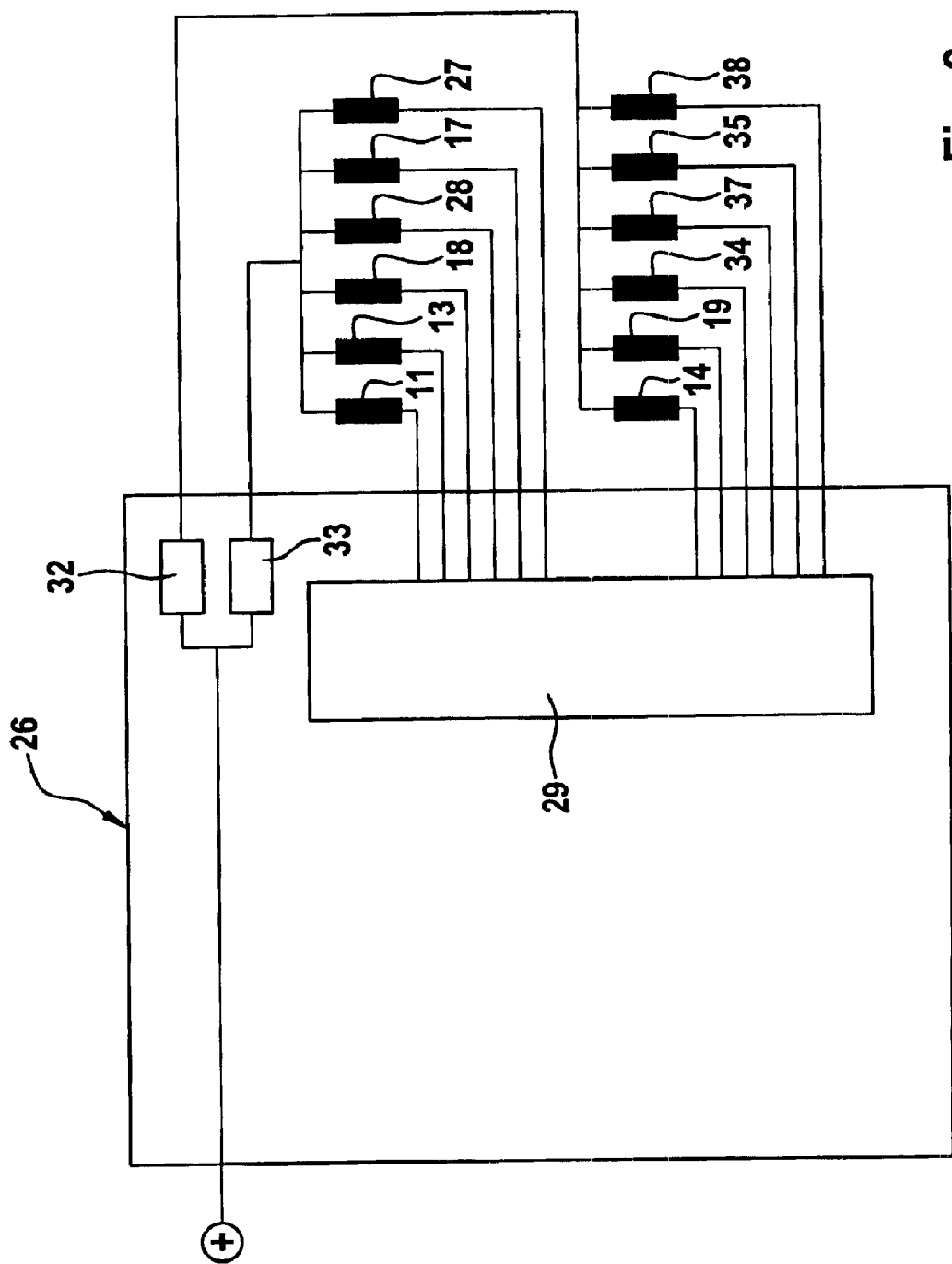
FIG. 3 is a third alternative of actuating the electromagnetic valves in an electrohydraulic brake system according to FIG. 1.

In the third example being shown in a greatly simplified view in FIG. 3, the group associated with the first additional valve driver stage 32 is composed of the separating valve 14 associated with the vehicle front axle, the pressure-compensating valve 19 associated with the vehicle front axle as well as the pressure control valves 34, 37, 35, 38 of the wheel brakes 9, 10 associated with the vehicle front axle. In contrast thereto, the group associated with the second additional valve driver stage 33 is composed of the separating valve 11 associated with the vehicle rear axle, the pressure-compensating valve 13 associated with the vehicle rear axle as well as the pressure control valves 17, 27, 18, 28 associated with the wheel brakes 7, 8 of the vehicle rear axle.

Upon failure of the first additional valve driver stage 32 or one of the drivers of the associated valve group, it is possible to electronically control the brake pressures in the wheel brakes 7, 8 associated with the vehicle rear axle without restrictions. A hydraulic through grip effected by the driver by way of his/her actuating or pedal force acting upon the master brake cylinder 2 can produce the brake pressure in the wheel brakes 9, 10 associated with the vehicle front axle.

Upon failure of the second additional valve driver stage 33 or one of the drivers of the associated valve group, it is possible to electronically control the brake pressures in the wheel brakes 9, 10 associated with the vehicle front axle without restrictions. A hydraulic through grip effected by the driver by way of his/her actuating or pedal force acting upon the master brake cylinder 2 can produce the brake pressure in the wheel brakes 7, 8 associated with the vehicle rear axle.

As can be taken from FIGS. 2 and 3, in particular, the additional valve driver stages 32, 33 are connected in each case between the corresponding valve group and the positive pole of a vehicle battery (only represented). It is, however, also feasible to interconnect the additional valve driver stages 32, 33 between the corresponding valve group and the vehicle mass.

What is claimed is:

1. Device for controlling electromagnetically operable valves of an electrohydraulic brake system for motor vehicles, comprising:
   - a device for detecting a driver's request for deceleration,
   - at least one of an emergency pressure generator or master brake cylinder operable by means of a brake pedal, wherein said master cylinder includes at least one pressure chamber, and a non-pressurized pressure fluid supply reservoir,
   - a hydraulic auxiliary pressure source whose pressure can be applied to wheel brakes that are connectable to the master brake cylinder by way of hydraulic connections closable by means of electromagnetically operable separating valves, and associated with said separating valves are electromagnetically operable pressure control valves that connect the wheel brakes to the pressure source in a pressure increase phase, and which are closed in a pressure maintaining phase and connect the wheel brakes to the pressure fluid supply reservoir in a pressure reduction phase,
   - electromagnetically operable pressure-compensating valves that permit a pressure compensation between the wheel brakes of a vehicle axle,
   - an electronic control and regulation unit for actuating the auxiliary pressure source, the separating valves,
   - a control and regulation unit which includes first and second valve drivers associated with which is a first and a second group of valves, wherein said driver stages are used to disable the first or the second group, respectively, when a malfunction occurs,
      - wherein the first valve driver is provided for the separating valve of a first vehicle axle, the pressure-compensating valve of a second vehicle axle and the pressure control valves being associated with respectively one brake of the first or the second vehicle axle, while the second valve driver is provided for the separating valve of the second vehicle axle, the pressure-compensating valve of the first vehicle axle and the pressure control valves being associated with the other two brakes of the first or the second vehicle axle.

2. Device as claimed in claim 1, wherein the first valve driver stage cooperatively engages the separating valves and for the pressure control valves respectively associated with a brake of a first or a second vehicle axle, and wherein the second valve driver cooperatively engages the pressure-compensating valves and the pressure control valves associated with two other wheel brakes of a first or a second vehicle axle.

3. Device as claimed in claim 1, wherein the first valve driver cooperatively engages the separating valve and the pressure-compensating valve as well as the pressure control valves of wheel brakes associated with a first vehicle axle, while the second valve driver cooperatively engages the separating valve and the pressure-compensating valve as well as the pressure control valves of wheel brakes associated with a second vehicle axle.

* * * * *